(12) United States Patent
Goyal

(10) Patent No.: US 9,367,573 B1
(45) Date of Patent: Jun. 14, 2016

(54) METHODS AND APPARATUS FOR ARCHIVING SYSTEM HAVING ENHANCED PROCESSING EFFICIENCY

(71) Applicant: EMC Corporation, Hopkinton, MA (US)

(72) Inventor: Ashish Goyal, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 568 days.

(21) Appl. No.: 13/927,187

(22) Filed: Jun. 26, 2013

(51) Int. Cl.
*G06F 17/30* (2006.01)
*G06F 7/00* (2006.01)

(52) U.S. Cl.
CPC .... *G06F 17/30312* (2013.01); *G06F 17/30067* (2013.01); *G06F 17/30008* (2013.01)

(58) Field of Classification Search
USPC ......................................................... 707/661
See application file for complete search history.

(56) References Cited

U.S. PATENT DOCUMENTS

| | | | |
|---|---|---|---|
| 7,689,862 B1 | 3/2010 | Bharthulwar et al. | |
| 8,060,709 B1 | 11/2011 | Arous et al. | |
| 8,326,805 B1 | 12/2012 | Arous et al. | |
| 8,533,155 B2 * | 9/2013 | Pinkney | G06F 17/30584 707/617 |
| 2010/0306236 A1 * | 12/2010 | Cychosz | G06F 17/30082 707/769 |
| 2013/0254208 A1 * | 9/2013 | Hazel | G06F 17/30336 707/741 |
| 2014/0101178 A1 * | 4/2014 | Ginter | G06F 17/30979 707/755 |

OTHER PUBLICATIONS

Jeffrey Dean and Sanjay Ghemawat; "MapReduce: Simplified Data Processing on Large Clusters", Google, Inc., to appear in OSDI 2004, 13 pages.
"Disaster Recovery in an EMC DiskXtender for Windows Environment", White Paper, May 2011, $EMC^2$, 14 pages.
"Backup and Recovery of Data Managed by EMC Diskxtender for Windows", White Paper, Feb. 2011, $EMC^2$, 11 pages.
"EMC DiskXtender for Windows and EMC RecoverPoint Interoperability", White Paper, Aug. 2009, $EMC^2$, 16 pages.

* cited by examiner

*Primary Examiner* — Kuen Lu
(74) *Attorney, Agent, or Firm* — Daly, Crowley, Mofford & Durkee, LLP

(57) ABSTRACT

Methods and apparatus for archiving files in a system with primary storage and secondary storage that reduces thread contention. A single input reader thread generates list of files for processing by multiple map threads that evaluate each file in a list against a number of archive policies, such as move, purge, index and delete. Reduce threads take the lists from the map threads and generates list of files for action under a given policy, e.g., move, purge, index, delete. This arrangement eliminates thread contention for files and lists.

15 Claims, 7 Drawing Sheets

METHODS AND APPARATUS FOR ARCHIVING SYSTEM HAVING ENHANCED PROCESSING EFFICIENCY

BACKGROUND

As is known in the art, file archiving systems are useful to move files for which there is not sufficient space on primary storage. The archiving of files allows for new data storage on primary storage while moving old or low priority data to secondary storage. Typically, a pointer or stub is left for data removed from primary storage by which the data can be pulled from secondary storage after archiving.

Based on a specified policy, files can be selected to be moved from primary storage to secondary storage. Files can be selected for movement to secondary storage based upon a variety of factors, such as last access date, size, type, user preference, etc. While secondary storage may provide access that is slower than primary storage, secondary storage can be relatively low-cost as compared with primary storage.

Primary storage is typically a LUN or a hard disk in server hardware. Secondary storage can be provided as disk, tape, EMC CENTERA content-addressable storage (CAS) platform for data archiving, EMC ATMOS cloud delivery platform to deliver and manage storage-as-a-service, etc. In general, secondary storage provides very large storage volumes at relatively low cost.

SUMMARY

The present invention provides method and apparatus for archiving files in accordance with policies with threads that avoid contention to enhance archiving efficiency. In an exemplary embodiment, a single input reader thread scans folders for files generates lists of files. A number of map threads take the lists of files runs the files through filters for the archiving policies, e.g., move, purge, index, and delete. Based upon the filter, each file is associated with a key to indicate whether action needs to be taken for the given policy. A number of reduce threads takes the map thread outputs and groups the files based on the key value. After grouping is complete, files can be placed on respective lists, e.g., move list, purge list, index list, delete list for processing. With this arrangement, thread contention is reduced or eliminated to enhance processing efficiency.

In one aspect of the invention, a method comprises: scanning files in a primary storage system based upon a plurality of file archiving policies to determine if any of the files should be archived to a second storage system by: providing a single input reader thread to scan folders for files and generate a plurality of lists of files, providing a plurality of map threads including a first one of the plurality of map threads to process a first one of the plurality of lists of files and a second one of the plurality of map threads to process a second one of the plurality of lists of files, the first one of the plurality of map threads processing each file in the first one of the plurality of lists of files to determine if the files meet criteria for each of a plurality of policies for archiving files, the second one of the plurality of map threads processing each file in the second one of the plurality of lists of files to determine if the files meet the criteria for each of a plurality of policies for archiving files, and providing a plurality of reduce threads to process output from the plurality of map threads to group files by a key value and output a first list for a first one of the plurality of policies for archiving files and a second list for a second one of the plurality of policies, wherein there is no contention between map threads and no contention between threads accessing the first and second lists for the plurality of policies for archiving files.

The method can further include one or more of the following features: the plurality of policies for archiving files includes a move policy, a purge policy, an index policy, and a delete policy, the plurality of policies for archiving files includes one or more of the following properties: file size, last access time, last modified time, last creation time, file attributes, file extension, the primary storage system includes a logical storage unit, the secondary storage system includes one or more of tape, optical storage, and NAS storage, and/or the primary storage system forms part of a data protection system.

In another aspect of the invention, an article comprises: at least one computer readable medium having non-transitory stored instructions that enable a machine to: scan files in a primary storage system based upon a plurality of file archiving policies to determine if any of the files should be archived to a second storage system by: providing a single input reader thread to scan folders for files and generate a plurality of lists of files, providing a plurality of map threads including a first one of the plurality of map threads to process a first one of the plurality of lists of files and a second one of the plurality of map threads to process a second one of the plurality of lists of files, the first one of the plurality of map threads processing each file in the first one of the plurality of lists of files to determine if the files meet criteria for each of a plurality of policies for archiving files, the second one of the plurality of map threads processing each file in the second one of the plurality of lists of files to determine if the files meet the criteria for each of a plurality of policies for archiving files, and providing a plurality of reduce threads to process output from the plurality of map threads to group files by a key value and output a first list for a first one of the plurality of policies for archiving files and a second list for a second one of the plurality of policies, wherein there is no contention between map threads and no contention between threads accessing the first and second lists for the plurality of policies for archiving files.

The article can further include one or more of the following features: the plurality of policies for archiving files includes a move policy, a purge policy, an index policy, and a delete policy, the plurality of policies for archiving files includes one or more of the following properties: file size, last access time, last modified time, last creation time, file attributes, file extension, the primary storage system includes a logical storage unit, the secondary storage system includes one or more of tape, optical storage, and NAS storage, and/or the primary storage system forms part of a data protection system.

In a further aspect of the invention, a system comprises: at least one processor, a memory coupled to the at least one processor, and a file archiving module, the file archiving module, the at least one processor, and the memory configured to: scan files in a primary storage system based upon a plurality of file archiving policies to determine if any of the files should be archived to a second storage system by: providing a single input reader thread to scan folders for files and generate a plurality of lists of files, providing a plurality of map threads including a first one of the plurality of map threads to process a first one of the plurality of lists of files and a second one of the plurality of map threads to process a second one of the plurality of lists of files, the first one of the plurality of map threads processing each file in the first one of the plurality of lists of files to determine if the files meet criteria for each of a plurality of policies for archiving files, the second one of the plurality of map threads processing each file in the second one of the plurality of lists of files to determine if the files meet the criteria for each of a plurality of policies for archiving files, and providing a plurality of reduce threads to process output from the plurality of map threads to group files by a key value and output a first list for a first one of the plurality of policies for archiving files and a second list for a second one of the plurality of policies, wherein there is no contention between map threads and no contention between threads accessing the first and second lists for the plurality of policies for archiving files.

The system can further include one or more of the following features: the plurality of policies for archiving files includes a move policy, a purge policy, an index policy, and a delete policy, the plurality of policies for archiving files includes one or more of the following properties: file size, last access time, last modified time, last creation time, file attributes, file extension, the primary storage system includes a logical storage unit, the secondary storage system includes one or more of tape, optical storage, and NAS storage, and/or the primary storage system forms part of a data protection system.

BRIEF DESCRIPTION OF THE DRAWINGS

The foregoing features of this invention, as well as the invention itself, may be more fully understood from the following description of the drawings in which.

DETAILED DESCRIPTION

Figure 1:
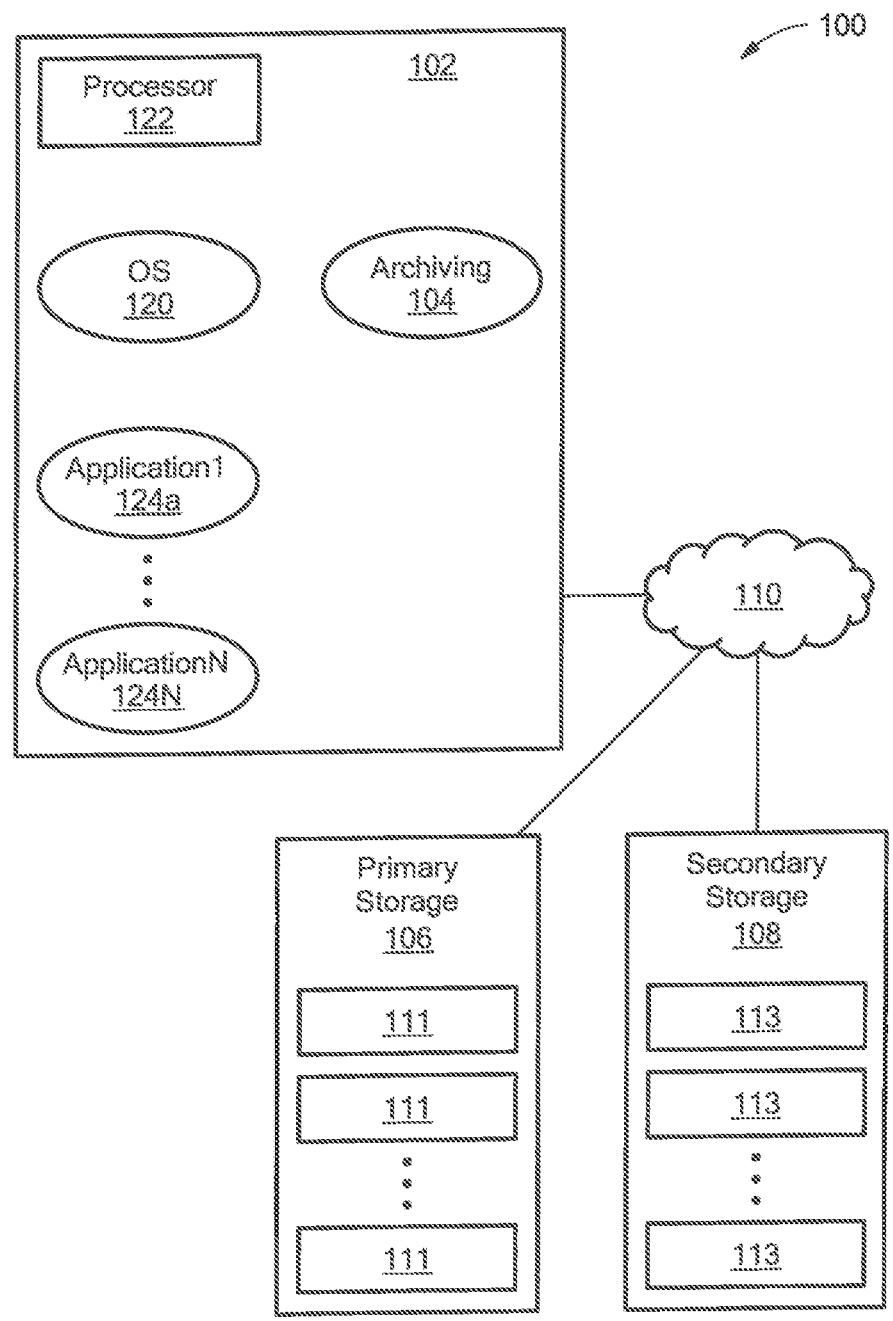
FIG. 1 is a schematic representation of an exemplary archiving system having file processing that reduces thread contention in accordance with exemplary embodiments of the invention.

FIG. 1 shows an exemplary data storage system 100 including a server 102 having an automated policy-based file archiving module 104 providing enhanced thread processing for file movement, purging, deleting, indexing and the like, in accordance with exemplary embodiments of the invention. By reducing or eliminating contention between the various threads that are active during the file archiving process, system efficiency is enhanced.

In an exemplary embodiment, the server 102, such as a production server, is coupled to a primary storage system 106 and to a secondary storage system 108, such as by a network 110. Files 111 can initially be created and saved on the primary storage system 104. Based on various policies, files can be moved, for example, to secondary storage 108 from primary storage 106. The moved files 113 then reside in secondary storage 108.

In the illustrated embodiment, the archiving module 104 is provided as an application on a machine having a WINDOWS-based operating system 120 running on at least one computer processor 122 supporting any practical number of applications 124a-N. It is understood that the archiving module 104 can form part of any suitable hardware and/or software component. In an exemplary embodiment, the archiving module is provided as part of a WINDOWS based system. In other embodiments, other operating systems are used. In another embodiment, the archiving module forms a part of a data protection system. It is understood that an inventive archiving module can form a part of any suitable operating system and computing environment in which thread processing efficiency is desirable.

In exemplary embodiments, the file archiving system 104 enables a user to perform operations on files. For example, in a move operation, a file is moved to the secondary storage 108 and it still resides on the primary storage 106. A purge operation moves a file to the secondary storage system 108 and replaces the file in the primary storage 106 with a stub. In a delete operation, a file can be deleted from primary and secondary storage 106, 108. In an index operation, a file can be indexed for searching without recalling the file from secondary storage 108.

In a WINDOWS environment, archiving module 104 provides an automated file archiving solution. It delivers a policy-based, file system-centric solution for migrating inactive data from a high-cost primary storage 106 to low-cost secondary storage 108, such as disk, tape, or optical devices. In exemplary embodiments of the invention, the archiving module 104 enables organizations to achieve data retention and compliance goals while maintaining service level agreements (SLAs), as well as reduce primary storage acquisition costs, management overhead, and backup and recovery times. In a data protection environment, an appliance, for example, supports replication of data over Fibre Channel to local SAN-attached storage and over WAN or Fibre Channel to remote sites, as well as failover to a local or remote replica enabling the user to continue operations from the replica in the event of a loss or disaster of the production data at the primary site.

In general, exemplary archiving modules are useful in environments that include:
  replication of primary file system data where archival is also required;
  replication of archived data (NAS media);
  replication of primary data that has been archived to EMC CENTERA, for example
  replication of both primary file system data and archived data In general, the archiving system extends the amount of space available on a computer's local NTFS volume by migrating files from the local drive to an external media, while making it appear that the files still reside on the local volume. The archiving system extends the storage capabilities of NTFS volumes by using the file migration services of a file system manager (FSM) component. The storage media is available through communication with media services.

Figure 2:
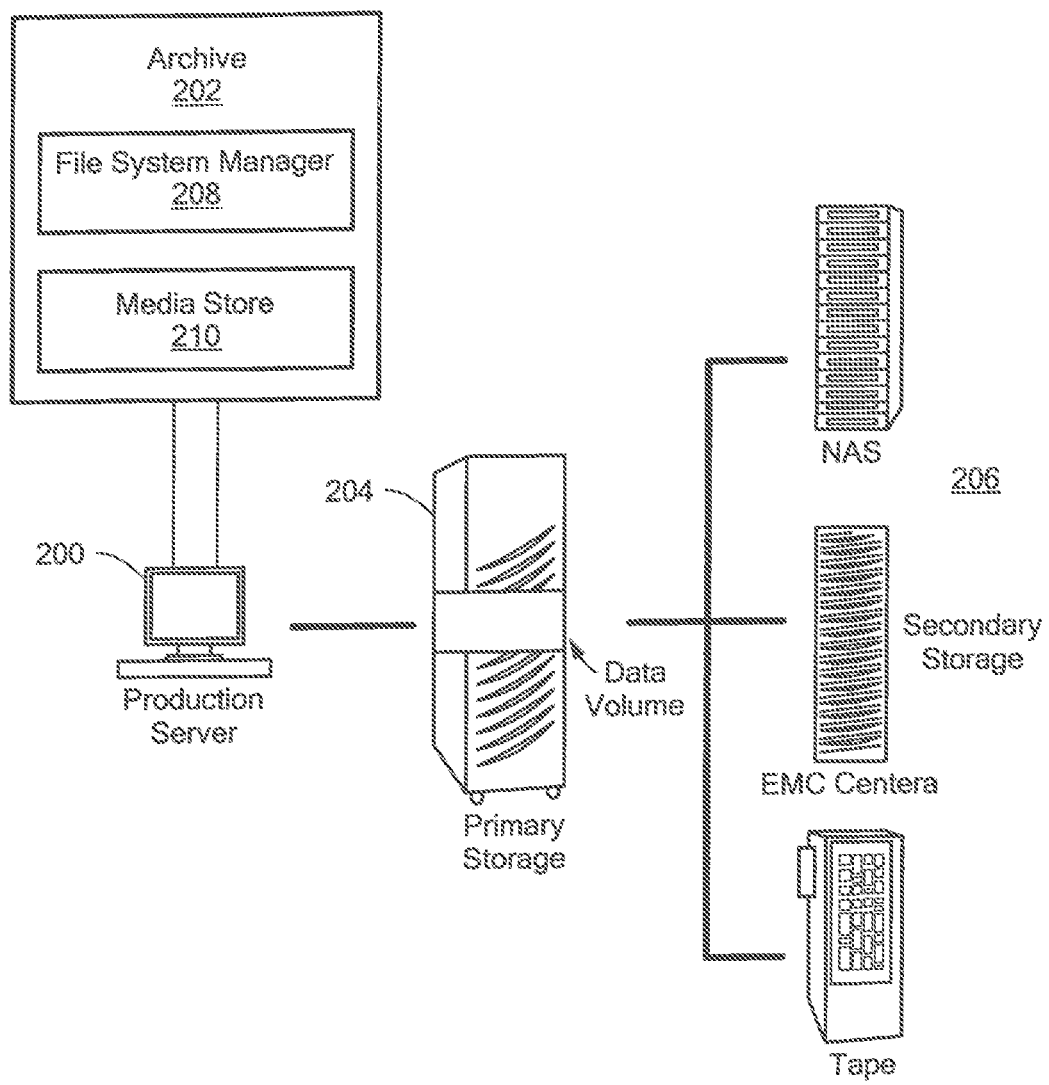
FIG. 2 is a schematic representation of a server including a file archiving module having file processing that reduces thread contention in accordance with exemplary embodiments of the invention.

FIG. 2 shows an exemplary system including a production server 200 having an archiving module 202 for enhanced archiving in accordance with exemplary embodiments of the invention. As files are created and saved on primary storage 204, the archiving module 202 targets candidate files for archiving. The archiving system moves files from primary 204 to secondary storage 206 and purges files from primary storage in accordance with respective policies.

The archiving module supports various media services, media types, and file systems, allowing the user to select the storage configuration best suited to available resources and storage needs of the organization. Files are moved to media by using a rule-based system that details criteria such as the age, size, type, and attributes of files for migration.

In an exemplary embodiment, the archiving module 202 includes a file system manager module 208 and a media store module 210. The file system manager 208 is a data mover and manages files saved to the extended drives to provide a storage solution. The archiving system 202 can use media services, such as media store 210 to manage the external media to which the archiving module writes the files and to connect to various storage device types.

File migration services include moving files to media and fetching files from media, based on a set of defined parameters. While retrieving files from the extended drive, all files, whether on the extended NTFS volume, or on the storage media, appear to be present locally on the NTFS volume. The file system manager 208 automates the migration of files to storage media using a rule-based system to enable the creating of rules, such as move rule, purge rule, and delete rule to define the criteria for moving files from the extended drive to one or more pieces of storage media.

Figure 3:
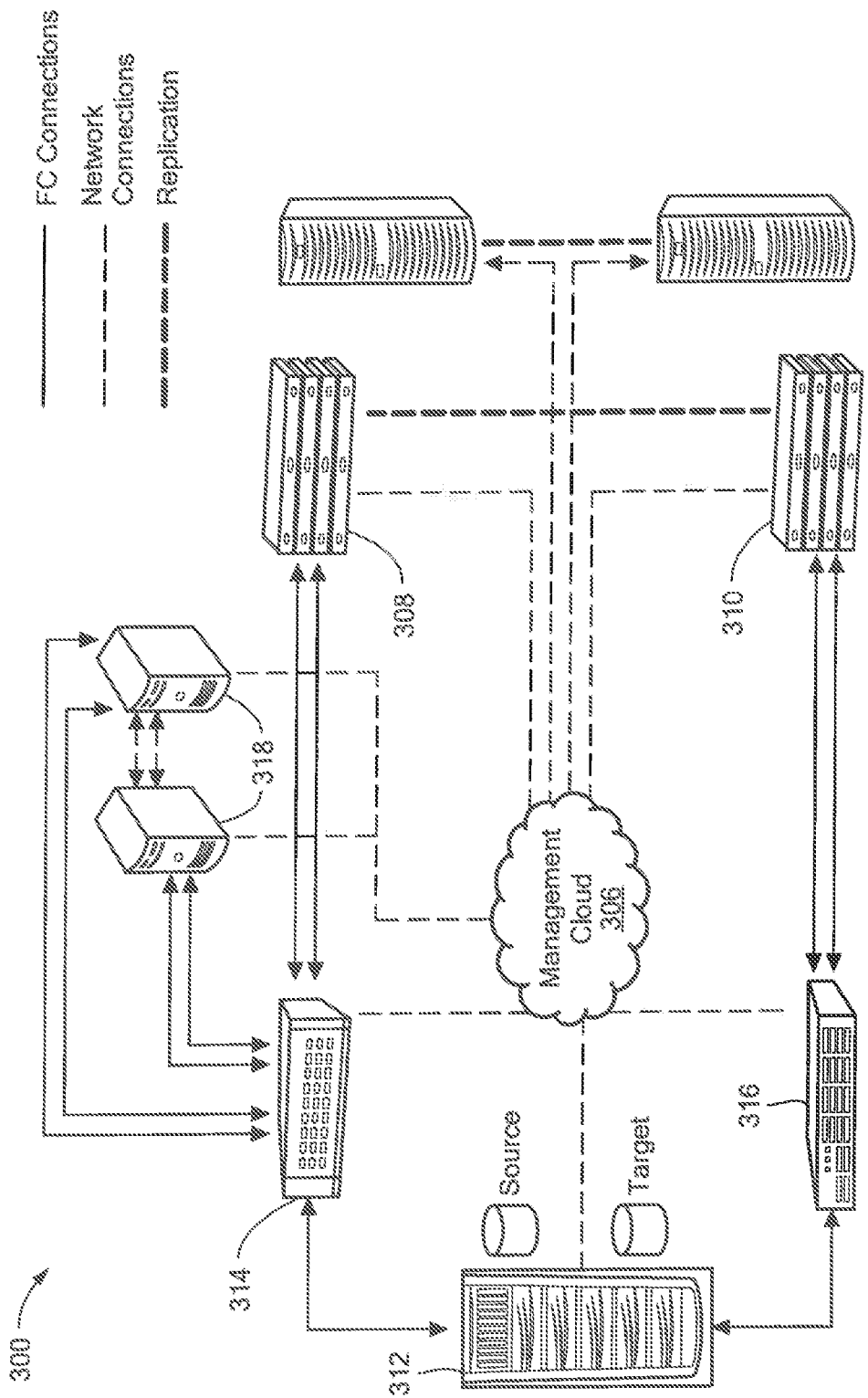
FIG. 3 is a schematic representation of a data protection system including a file archiving module having file processing that reduces thread contention in accordance with exemplary embodiments of the invention.

In data protection environment 300 shown in FIG. 3, data is replicated over a distance. Data can be replicated locally within the same site using continuous data protection. Data can be replicated remotely continuous remote replication. Data can be replicated both locally and remotely using concurrent local and remote data protection. Replication of data is supported over Fibre Channel to local SAN attached storage and over WAN or Fibre Channel to remote sites.

The environment 300 includes production storage 302 and recovery storage 304 coupled to a cloud 306, such as a SAN network. A production journaling appliance 308 and a recovery journaling appliance 310 are coupled to storage 302, 304 via the network 306. Enterprise storage 312 is coupled to a source Fibre channel switch 314, which is coupled to the production appliance 308, and to a target Fibre Channel switch 316, which is coupled to the recovery appliance 310.

An archiving cluster 318 is coupled to the source switch 314 and the network 306. The general architecture of the illustrated data storage environment is well known to one of ordinary skill in the art. In an exemplary embodiment, the archiving cluster 318 provides file archiving with enhanced thread efficiency. Illustrative files that can be archived by the cluster 318 include .pdf, MS OFFICE, .txt, .mp3, etc.

In general, to qualify files for archiving operations, files on the primary storage are scanned. Each file is then passed through a policy filter for each operation in a 'pipe' sequence. For example, a move operation is governed by a first policy, a delete operation is governed by a second policy, and so on. Each operation is governed by a separate policy.

Policies can be set based on a variety of file properties including:
File Size—e.g., file size greater than 100 Kb or less then 10 MB
Last Access time—e.g., file older than ten days since "Last Access Time"
Last modified time—e.g., file older than thirty days since "Last modified time"
Last creation time—e.g., file created fifteen days earlier
File attributes—file based on system attributes such as "System", "Hidden" etc.
File Extension—File based on extension such *.doc for word doe files.

Figure 4:
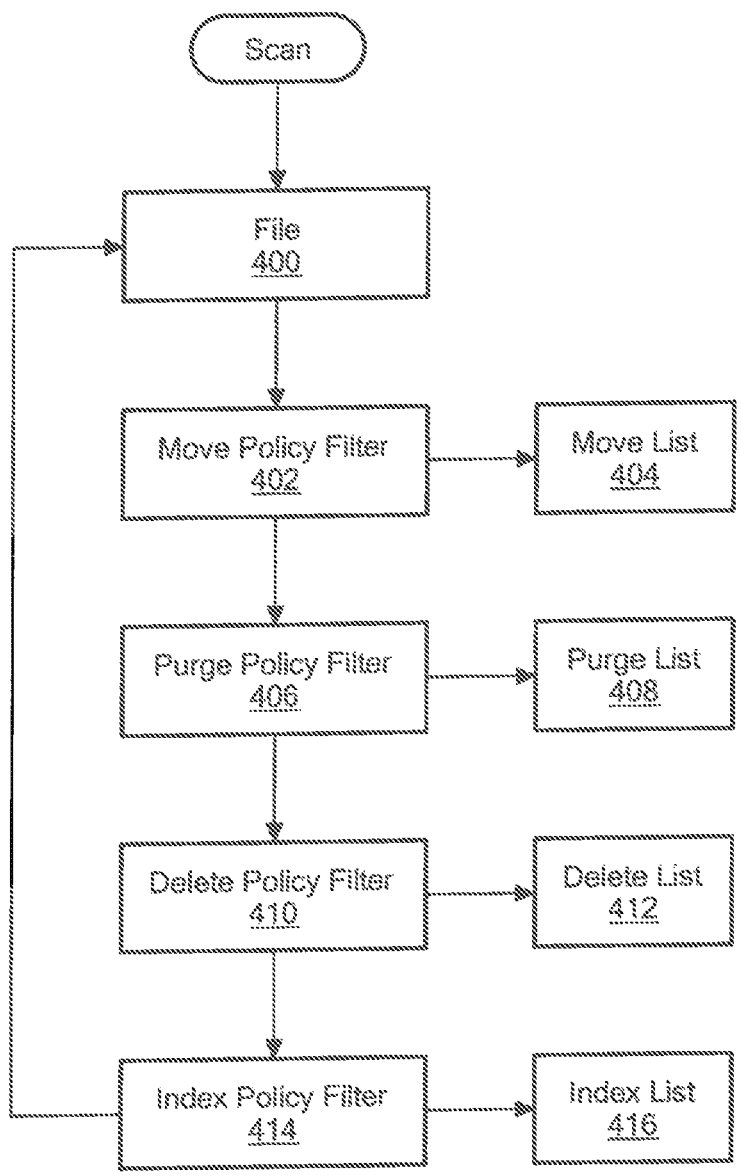
FIG. 4 is a diagram showing exemplary processing steps for file archiving with file processing that reduces thread contention in accordance with exemplary embodiments of the invention.

FIG. 4 shows an exemplary sequence of steps for a scan in file archive policy processing in accordance with exemplary embodiments of the invention. As the scan progresses, each file is passed through various policy filters and added to a corresponding list. For e.g., file matching the "Move" policy filter causes file to be added to Move List.

In step 400, a file is scanned. In step 402, the file is scanned to determine if the file meets the policy requirements for a file move. If so, in step 404 the file is added to a list of files to be moved from primary storage to secondary storage. In step 406, the file is scanned to determine whether the file meets the purge policy requirements. If so, in step 408, the file is added to the purge list. In step 410, the file is scanned to determine whether the delete policy requirements are met. If so, in step 412, the file is added to the delete list. In step 414, the file is scanned to determine whether the file meets the index policy criteria. If so, in step 416, the file is added to the index list.

In prior art systems, the file scanning process spawns multiple threads depending upon the number of processor-cores in the system. A thread starts scanning the files in a folder. As soon as a new folder is encountered in a parent folder, the new folder is added to a folder list. These folders are then picked up by an idle thread such that the scanning of files is not recursive. Each thread first scans all files in current the folder and then selects a new folder.

This design may be acceptable if files are spread relatively evenly across the folders. However, typically not all folders have same number of files. For example, one folder might have one million files while another folder may have one thousand files. So the scan time to completion depends on largest folders. In addition, this processing also increases contention as all the processing threads compete for access to the various lists to add files. For example, multiple threads will attempt to add files to the move list 404 once the file is run through the move policy filter 402.

Figure 5:
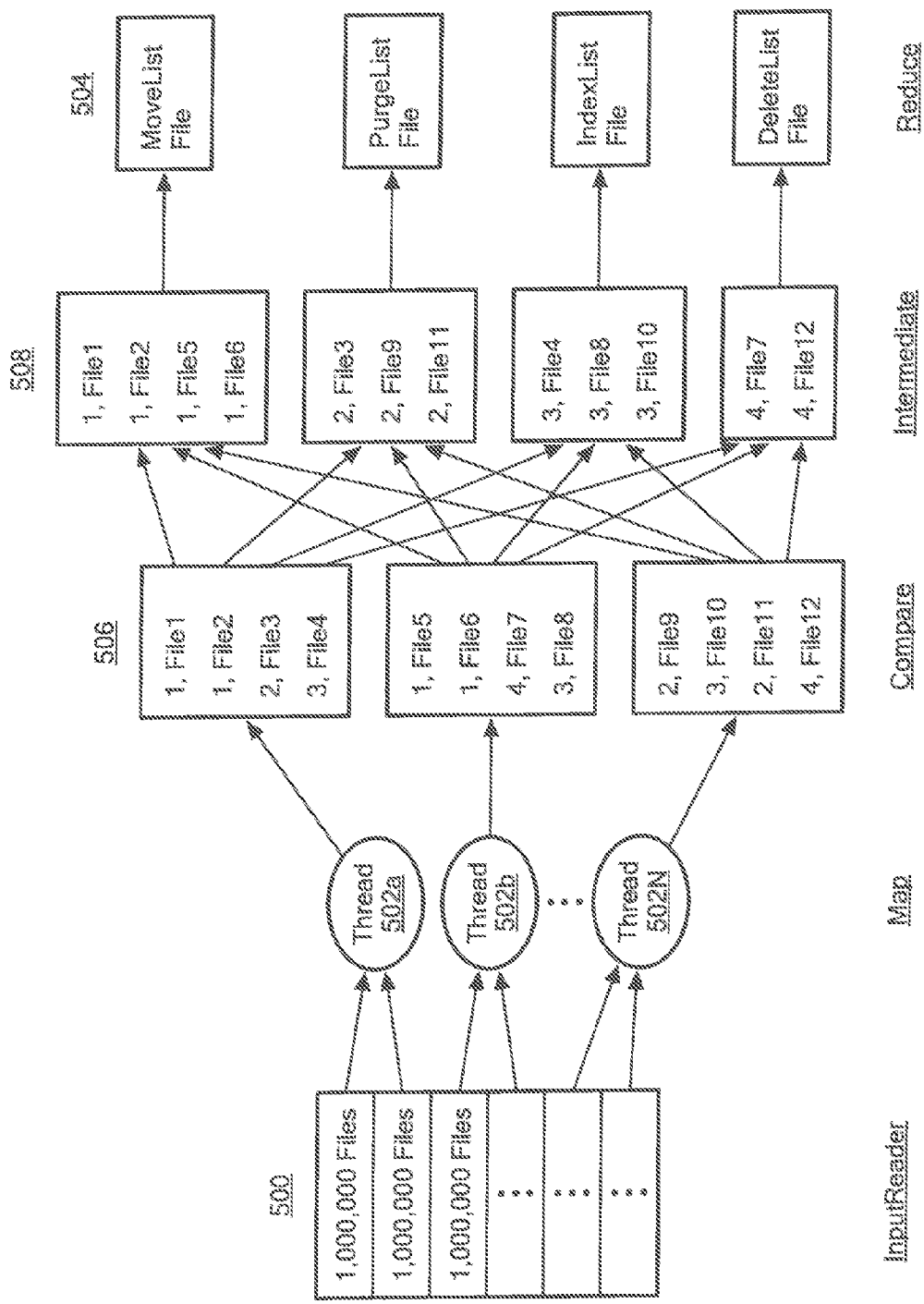
FIG. 5 is a diagram showing threads and processing for file archiving with file processing that reduces thread contention in accordance with exemplary embodiments of the invention.

FIG. 5 shows an exemplary file scan processing for archiving files in accordance with exemplary embodiments of the invention. In the illustrated embodiment, there are a number of thread types involved in the implementation. An input reader thread 500 scans the folder for files and generates a list of files to be processed later by a map thread 502. The number of files in a list is user configurable. There is one input reader thread in the illustrative implementation.

Any practical number of map threads 502a-N can be created to process information from the input reader thread 500. Each map thread 502 takes a list of files and runs the files through the policy filters, e.g., move, purge, delete, index. Based on filter processing, each file is associated with a key to indicate if the file needs to be moved, purged, deleted or indexed. Reduce threads 504, of which there can be any practical number, process the list generated by the map threads 502 and group the files based on key value. Once all files are grouped based on a compare 506 of information from the map threads and intermediate processing 508, the reduce threads write the files to the appropriate list, e.g., move list, purge list, delete list and index list, based upon the respective policies. It is understood that compare 506 processing compares the key and groups the files based on key and that intermediate processing 508, is not a process, but rather an intermediate state which stores the output of the compare process 506. The reduce process then processes the intermediate results from the compare process 506.

Figure 6:
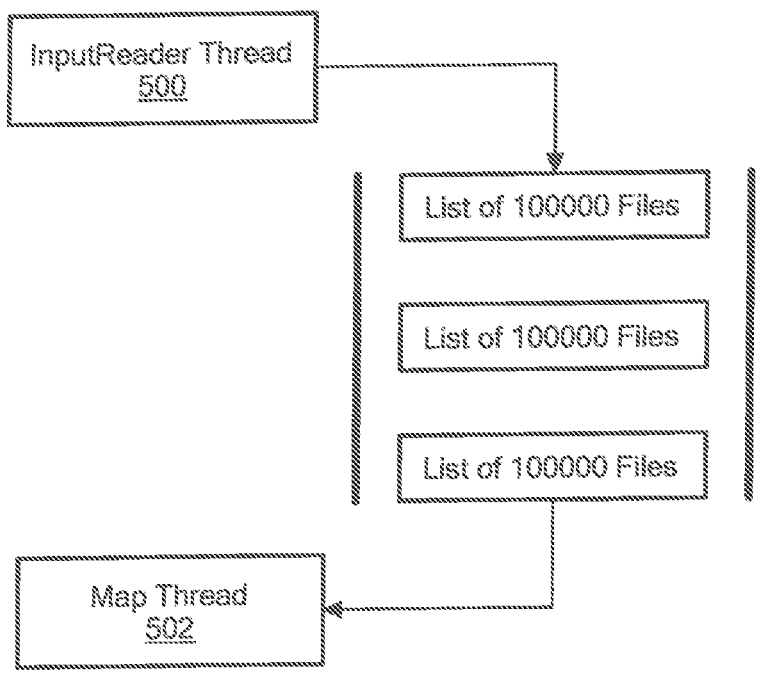
FIG. 6 is a schematic representation of an input reader thread and map threads for file archiving with file processing that reduces thread contention in accordance with exemplary embodiments of the invention.

With this arrangement, there is no common list so that thread contention is avoided. The input read thread 500 generates a list of files that is removed by a map thread 502 using a "queue" data structure. Until the list is full, it is not inserted into queue. As shown in FIG. 6, while the map threads 502 are executing on 100000 files, for example, the input reader thread 500 generates another list of 100000 files. Thus, there is no sharing of lists of files, and therefore, no thread contention for the lists or files. Similarly, the map thread 502 works with its own list of files which is inserted into a queue. This list is then processed by the reduce threads 504.

There is no thread swapping since there is no contention between threads so that threads are not swapped out of processors. This increases processing efficiency as thread contents are not moved in and out of memory.

In an exemplary embodiment, the map and reduce procedures utilize the map reduce programming model for processing data sets in functional programming languages. A map procedure performs filtering and sorting and reduce procedures perform a summary operation. The map procedure runs once for each key value K1 and generates output organized by key value K2. The reduce procedure is run once for each K2 key value produced by the map procedure. The output from reduce is sorted by the K2 key value and output in a desired output. For example, a map function to perform a word count in a document breaks a line in the document into words and outputs a key/value pair for each word. Each output pair contains the word as the key and the number of occurrences of the word in the line as the value. The reduce function takes in the input values, sums them, and generates a single output of the word and the final count of occurrences of the word.

Figure 7:
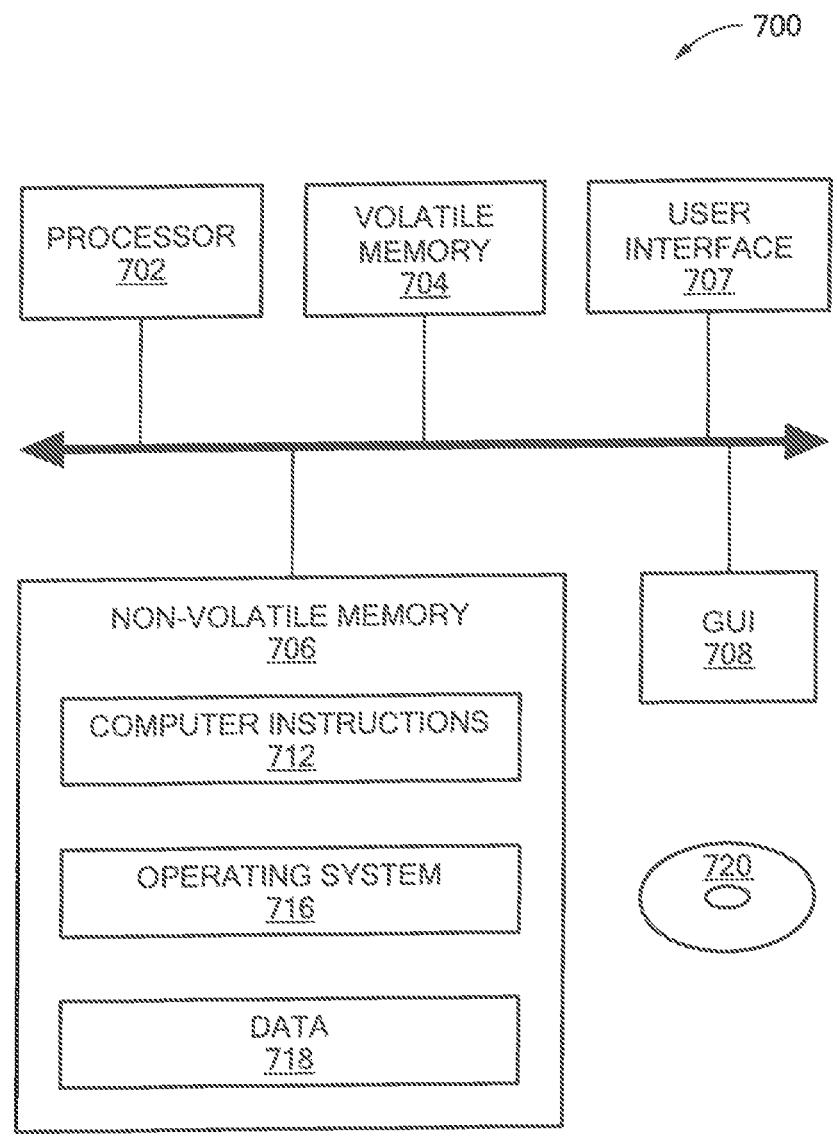
FIG. 7 is a schematic representation of an exemplary computer that can perform at least a portion of the processing described herein.

FIG. 7 shows an exemplary computer 700 that can perform at least part of the processing described herein. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method comprising, scanning files in a primary storage system based upon a plurality of file archiving policies to determine if any of the files should be archived to a second storage system by:

providing a single input reader thread to scan folders for files and generate a plurality of lists of files;

providing a plurality of map threads including a first one of the plurality of map threads to process a first one of the plurality of lists of files and a second one of the plurality of map threads to process a second one of the plurality of lists of files, the first one of the plurality of map threads processing each file in the first one of the plurality of lists of files to determine if the files meet criteria for each of a plurality of policies for archiving files, the second one of the plurality of map threads processing each file in the second one of the plurality of lists of files to determine if the fries meet the criteria for each of a plurality of policies for archiving files; and providing a plurality of reduce threads to process output from the plurality of map threads to group files by a key value and output a first list for a first one of the plurality of policies for archiving files and a second list for a second one of the plurality of policies, wherein there is no contention between map threads and no contention between threads accessing the first and second lists for the plurality of policies for archiving files, and wherein the plurality of policies for archiving files includes a move policy, a purge policy, an index policy, and a delete policy.

2. The method according to claim 1, wherein the plurality of policies for archiving files includes one or more of the following properties: file size, last access time, last modified time, last creation time, file attributes, file extension.

3. The method according to claim 1, wherein the primary storage system includes a logical storage unit.

4. The method according to claim 1, wherein the secondary storage system includes one or more of tape, optical storage, and NAS storage.

5. The method according to claim 1, wherein the primary storage system forms part of a data protection system.

6. An article, comprising:

at least one computer readable medium having non-transitory stored instructions that enable a machine to:

scan files in a primary storage system based upon a plurality of file archiving policies to determine if any of the files should be archived to a second storage system by:

providing a single input reader thread to scan folders for files and generate a plurality of lists of files;

providing a plurality of map threads including a first one of the plurality of map threads to process a first one of the plurality of lists of files and a second one of the plurality of map threads to process a second one of the plurality of lists of files, the first one of the plurality of map threads processing each file in the first one of the plurality of lists of files to determine if the files meet criteria for each of a plurality of policies for archiving files, the second one of the plurality of map threads processing each file in the second one of the plurality of lists of files to determine if the files meet the criteria for each of a plurality of policies for archiving files; and providing a plurality of reduce threads to process output from the plurality of map threads to group files by a key value and output a first list for a first one of the plurality of policies for archiving files and a second list for a second one of the plurality of policies, wherein there is no contention between map threads and no contention between threads accessing the first and second lists for the plurality of policies for archiving files, and wherein the plurality of policies for archiving files includes a move policy, a purge policy, an index policy, and a delete policy.

7. The article according to claim 6, wherein the plurality of policies for archiving files includes one or more of the following properties: file size, last access time, last modified time, last creation time, file attributes, file extension.

8. The article according to claim 6, wherein the primary storage system includes a logical storage unit.

9. The article according to claim 6, wherein the secondary storage system includes one or more of tape, optical storage, and NAS storage.

10. The article according to claim 6, wherein the primary storage system forms part of a data protection system.

11. A system, comprising:
at least one processor;
a memory coupled to the at least one processor; and
a file archiving module, the file archiving module, the at least one processor, and the memory configured to:

scan files in a primary storage system based upon a plurality of file archiving policies to determine if any of the files should be archived to a second storage system by:

providing a single input reader thread to scan folders for files and generate a plurality of lists of files;

providing a plurality of map threads including a first one of the plurality of map threads to process a first one of the plurality of lists of files and a second one of the plurality of map threads to process a second one of the plurality of lists of files, the first one of the plurality of map threads processing each file in the first one of the plurality of lists of files to determine if the files meet criteria for each of a plurality of policies for archiving files, the second one of the plurality of map threads processing each file in the second one of the plurality of lists of files to determine if the files meet the criteria for each of a plurality of policies for archiving files; and providing a plurality of reduce threads to process output from the plurality of map threads to group files by a key value and output a first list for a first one of the plurality of policies for archiving files and a second list for a second one of the plurality of policies, wherein there is no contention between map threads and no contention between threads accessing the first and second lists for the plurality of policies for archiving files, wherein the plurality of policies for archiving files includes a move policy, a purge policy, an index policy, and a delete policy.

12. The system according to claim 11, wherein the plurality of policies for archiving files includes one or more of the following properties: file size, last access time, last modified time, last creation time, file attributes, file extension.

13. The system according to claim 11, wherein the primary storage system includes a logical storage unit.

14. The system according to claim 11, wherein the secondary storage system includes one or more of tape, optical storage, and NAS storage.

15. The system according to claim 11, wherein the primary storage system forms part of a data protection system.

* * * * *